(12) United States Patent
Yan et al.

(10) Patent No.: US 11,381,438 B2
(45) Date of Patent: Jul. 5, 2022

(54) MULTIPLE ACCESS SCHEMES WITH INTERFERENCE MITIGATION

(71) Applicant: ZTE Corporation, Guangdong (CN)

(72) Inventors: Chunlin Yan, Guangdong (CN); Zhifeng Yuan, Guangdong (CN); Yifei Yuan, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/215,430

(22) Filed: Mar. 29, 2021

(65) Prior Publication Data

US 2021/0218611 A1 Jul. 15, 2021

Related U.S. Application Data

(63) Continuation of application No. PCT/CN2018/108552, filed on Sep. 29, 2018.

(51) Int. Cl.
*H04L 27/26* (2006.01)
*H04L 1/00* (2006.01)
*H04L 5/00* (2006.01)
*H04L 25/03* (2006.01)

(52) U.S. Cl.
CPC ........ *H04L 27/2614* (2013.01); *H04L 1/0042* (2013.01); *H04L 1/0071* (2013.01); *H04L 5/0021* (2013.01); *H04L 25/03866* (2013.01); *H04L 27/263* (2013.01)

(58) Field of Classification Search
CPC . H04L 27/2614; H04L 1/0042; H04L 1/0071; H04L 5/0021; H04L 25/03866; H04L 27/263; H04L 27/2626; H04L 27/3444; H04L 27/3488; H04J 13/00
See application file for complete search history.

(56) References Cited

U.S. PATENT DOCUMENTS

| | | |
|---|---|---|
| 10,917,167 B2 | 2/2021 | Jia et al. |
| 2018/0077685 A1 | 3/2018 | Wu et al. |
| 2019/0013906 A1* | 1/2019 | Taherzadeh Boroujeni ................ H04L 27/2602 |
| 2019/0173616 A1* | 6/2019 | Xiong ............... H04W 72/0466 |
| 2019/0312691 A1* | 10/2019 | Park ....................... H04L 1/0041 |
| 2020/0077402 A1* | 3/2020 | Lei .......................... H04J 13/16 |
| 2020/0091962 A1* | 3/2020 | Bayesteh .............. H04L 1/0042 |
| 2020/0092057 A1* | 3/2020 | Herath .................. H04L 5/0016 |

FOREIGN PATENT DOCUMENTS

CN 107534638 A 1/2018

OTHER PUBLICATIONS

International Search Report and Written Opinion in International Application No. PCT/CN2018/108552, dated Jul. 1, 2019, 7 pages.

(Continued)

*Primary Examiner* — Dac V Ha
(74) *Attorney, Agent, or Firm* — Perkins Coie LLP

(57) ABSTRACT

Methods, systems, and devices for multiple access with interference mitigation are described. A wireless communication method is provided to comprise: generating, from information bits, a modulated signal; spreading the modulated signal using a spreading code to provide a spread data signal; processing the spread data signal through a randomization; and transmitting an orthogonal frequency division multiplexing (OFDM) signal based on an output of the processing.

18 Claims, 14 Drawing Sheets

(56) References Cited

OTHER PUBLICATIONS

Qualcomm Incorporated. "Transmitter Side Signal Processing Schemes for NOMA" 3GPP TSG RAN WG1 Meeting #94 R1-1809434, Aug. 24, 2018 (Aug. 24, 2018), 11 pages.
ZTE. "Email discussion to collect detailed description of the NOMA schemes" 3GPP TSG RAN WG1 Meeting #94 R1-1809844, Aug. 24, 2018 (Aug. 24, 2018), 53 pages.
ZTE. "Transmitter side designs for NOMA" 3GPP TSG RAN WG1 Meeting #94 R1-1808151, Aug. 24, 2018 (Aug. 24, 2018), 8 pages.
ZTE. "Offline summary of transmitter side signal processing schemes for NOMA" 3GPP TSG RAN WG1 Meeting #94 R1-1809786, Aug. 24, 2018 (Aug. 24, 2018), 19 pages.

* cited by examiner

MULTIPLE ACCESS SCHEMES WITH INTERFERENCE MITIGATION

CROSS-REFERENCE TO RELATED APPLICATIONS

This application is a continuation of International Patent Application No. PCT/CN2018/108552, filed on Sep. 29, 2018, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, thereby requiring robust interference mitigation when using multiple access protocols.

SUMMARY

This document relates to methods, systems, and devices for multiple access in the presence of interference. The disclosed technology describes methods that can be implemented at a plurality of mobile devices (or terminals, or user equipment) to ensure that they can access the network with minimal interference from each other.

In one aspect, a wireless communication method is provided to comprise: generating, from information bits, a modulated signal; spreading the modulated signal using a spreading code to provide a spread data signal; processing the spread data signal through a randomization; and transmitting an orthogonal frequency division multiplexing (OFDM) signal based on an output of the processing.

In another aspect, a wireless communication method is provided to comprise: generating, from information bits, a modulated signal; performing a Discrete Fourie Transform (DFT) operation to the modulated signal to provide a transformed signal; spreading the transformed signal using a spread code; and transmitting an output of the spreading.

In another aspect, the above-described methods are embodied in the form of processor-executable code and stored in a computer-readable program medium. In another aspect, a device that is configured or operable to perform the above-described methods is disclosed.

The above and other aspects and their implementations are described in greater detail in the drawings, the descriptions, and the claims.

DETAILED DESCRIPTION

The disclosed technology provides implementations and examples of multiple access schemes with interference mitigation. Some implementations of the disclosed technology use techniques to reduce PAPR which are increased due to a spreading operation in spreading-based scheme. Some implementations of the disclosed technology use techniques to apply spreading to DFT-s-OFDM systems to facilitate multi-user interference suppression. In the present document, 5G terminology is used only as an example illustration and the disclosed techniques are also applicable to other, non-5G system.

In recent years, non-orthogonal multiple access (NOMA) schemes have received significant attention for the fifth generation (5G) cellular networks. One of the reasons why 5G implements NOMA is its ability to serve multiple users that are using the same time and frequency resources. Some examples of NOMA techniques are based on power-domain multiple access, code-domain multiple access, pattern division multiple access, multiuser shared access, and resource spread multiple access, e.g., power-domain NOMA attains multiplexing in the power domain, whereas code-domain NOMA achieves multiplexing in the code domain. In order to support higher throughput and massive and heterogenous connectivity for 5G networks, multi-branch NOMA schemes are utilized. In NOMA, several waveforms have been proposed, which include CP-OFDM (Cycle Prefix-Orthogonal Frequency Division Multiplexing) and DFT-s-OFDM (Discrete Fourier Transform spread Orthogonal Frequency Division Multiplexing). As an example, the disclosed technology will be discussed for CP-OFDM and DFT-s-OFDM waveforms. However, the disclosed technology can be applied to other waveforms, without being limited to the CP-OFDM and DFT-s-OFDM waveforms.

Figure 1:
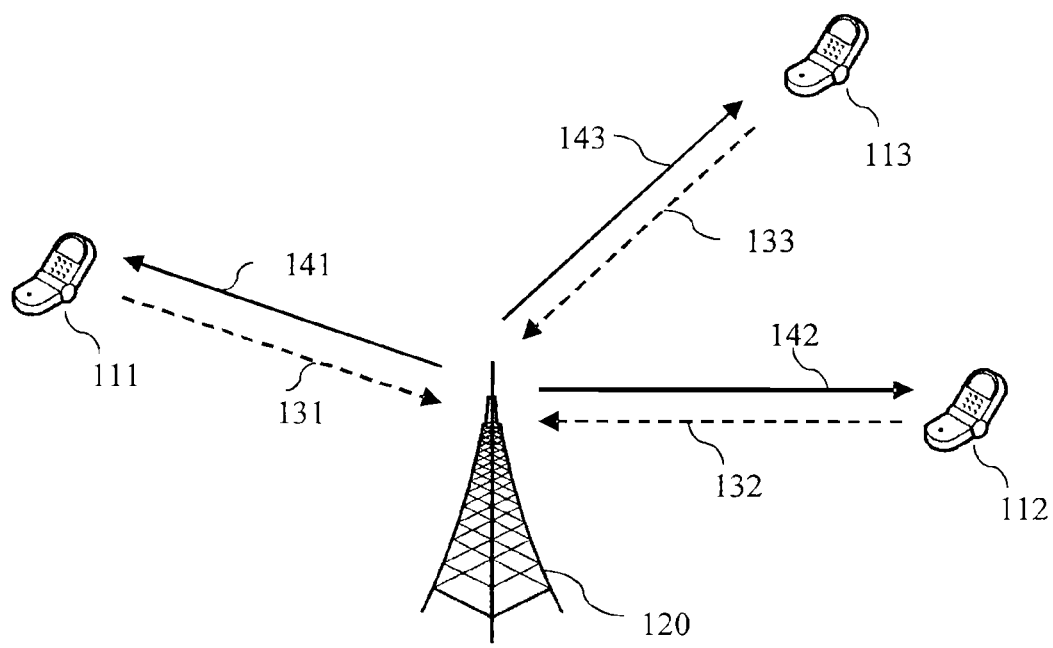
FIG. 1 shows an example of a base station (BS) and user equipment (UE) in wireless communication based on some implementations of the disclosed technology.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
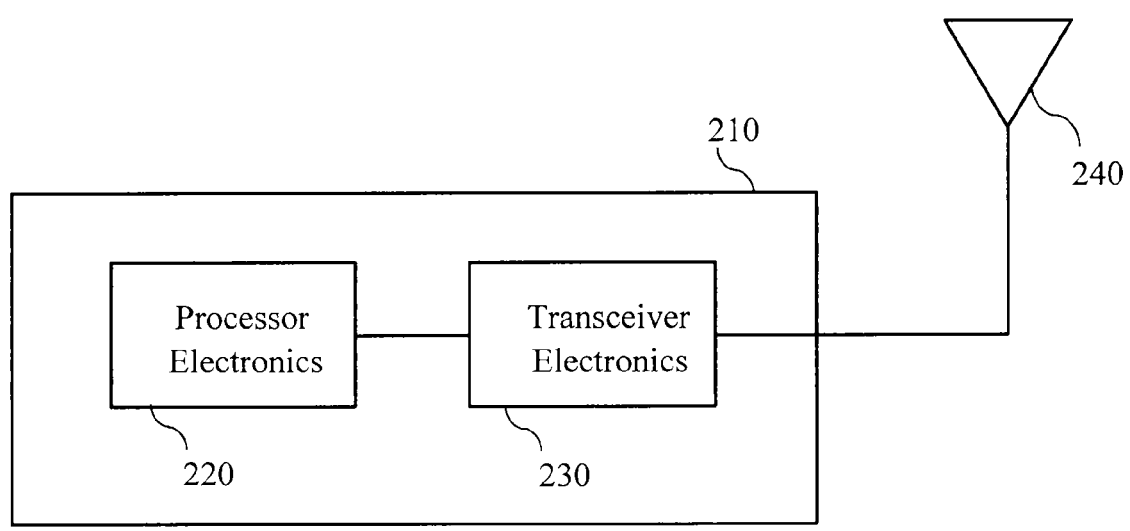
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. In some implementations, the apparatus 210 can include transceiver electronics 230 to send and/or receive wireless signals over two or more antennas 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 905.

Figure 3:
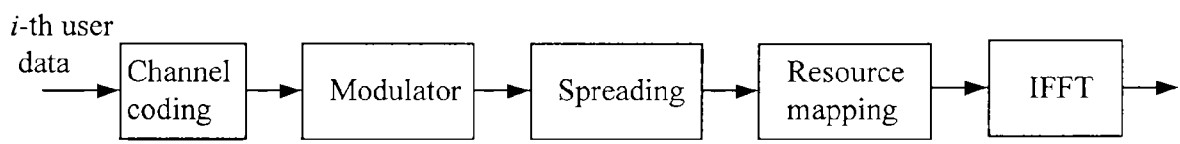
FIG. 3 shows a conventional NOMA data processing for CP-OFDM systems.

FIG. 3 shows a conventional NOMA data processing for Cyclic Prefix OFDM (CP-OFDM) systems. For data to be transmitted to a user, channel coding is performed to provide a coded signal. The coded signal is then modulated by a modulator. A spreading is applied on the modulated signal. As shown in FIG. 3, a resource mapping is performed on the spread data signal before the transmission. An IFFT (Inverse Fast Fourier Transform) module can be added after the resource mapping to provide OFDM signal for transmission.

In the CP-OFDM systems, the spreading is applied for user separation. By applying the spreading, multi-user interference can be suppressed. The spreading, however, causes the Peak-to-Average Power Ratio (PAPR) to increase. Low PAPR is essential for power efficient transmission from devices and is considered as one of the requirements for wireless communication systems. High PAPR leads to distortion of the signal if the transmitter has nonlinear components such as power amplifiers. Nonlinear devices will cause spectral spreading, inter modulation and constellation distortion. Also, high PAPR signals prevent power amplifiers (PA) from operating in a near saturation region reducing the PA efficiency. To address the increase of PAPR and avoid the disadvantages caused by the increase of PAPR, the disclosed technology provides a multi-branch NOMA scheme using randomization for CP-OFDM systems.

Figure 4A:
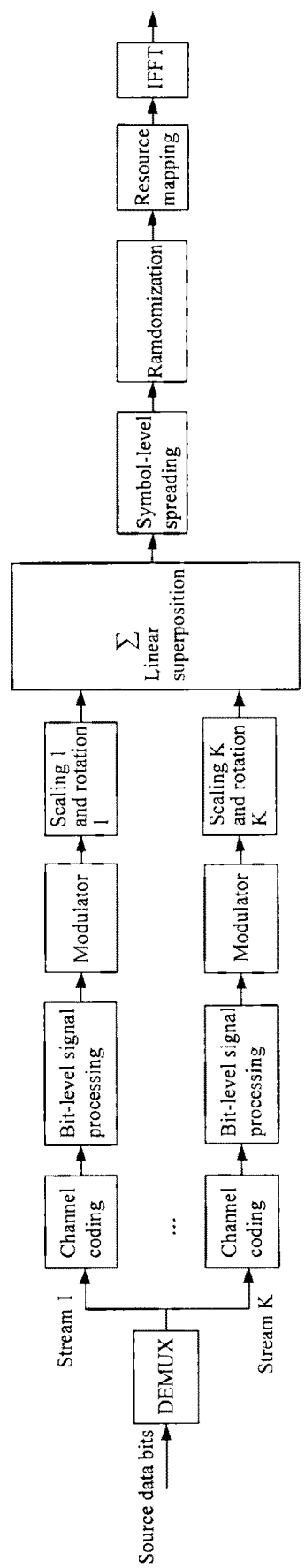
FIGS. 4A and 4B show examples of a multi-branch NOMA scheme for CP-OFDM systems based on some implementations of the disclosed technology.
Figure 4B:
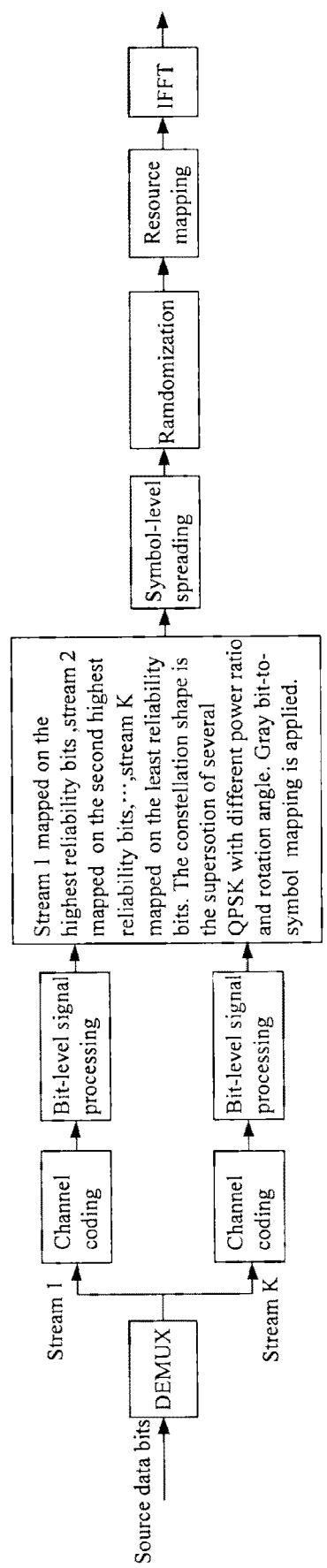

FIGS. 4A and 4B show examples of a multi-branch NOMA scheme for CP-OFDM based on the disclosed technology. FIG. 4A shows an example of a multi-branch NOMA scheme employing separate modulation and FIG. 4B shows an example of a multi-branch NOMA scheme employing joint modulation where gray bit-to-symbol mapping is employed. Referring to FIG. 4A, information data is divided into K independent data streams. Then, channel coding is performed to each data stream. In some implementations, the same channel code is applied to each data stream. Various coding schemes may be applied, which include turbo coding, LDPC (low density parity code) coding, Polar coding, or any combination thereof. In some implementations, the different channel codes are applied to each data stream. A bit-level signal processing is carried out on the channeled coded bits of each data stream. In some implementations, the bit-level signal processing includes bit-level interleaver and/or bit-level scrambling. The data is then provided to a modulator and further processed to generate modulated data. Scaling and rotation are performed for the modulated data and superposition is performed to provide superimposed signals. The spreading is performed on the superimposed signals. In some implementations, the spreading is processed to perform symbol-level spreading. After the spreading, the randomization is performed. The randomization helps to reduce the PAPR which increases by the spreading operation.

In some implementations, the randomization processes the spread data using an interleaver that is cell-specific. In some implementations, the randomization processes the spread data using an interleaver that is user-grouped. In some implementations, the scramble code is cell-specific to facilitate a Minimum Mean Squared Error (MMSE) operation among the multi-user signals ("cell-specific scrambling"). For the case of cell-specific scrambling, a respective scrambling code is used for each user device in the cell. In some implementations, a same scramble code is used for a group of users ("user-grouped scrambling"). A group of user (devices) whose signals are superposed on the same resource use a same scrambler. Because the users use the same scrambler, joint space-spreading MMSE operation can be performed on the spread signals to suppress the multi-user interference effectively. A group of user (devices) whose signals are superposed on the same resource use a same scrambler. Because the users use the same scrambler, joint space-spreading MMSE operation can be performed on the spread signals to suppress the multi-user interference effectively.

In FIG. 4B, information data is divided into K independent data streams. Then, channel coding is performed to each data stream. In some implementations, the same channel code is applied to each data stream. Various coding schemes may be applied, which include turbo coding, LDPC coding, Polar coding, or any combination thereof. In some implementations, the different channel codes are applied to each data stream. A bit-level signal processing is carried out on the channeled coded bits of each data stream. In some implementations, the bit-level signal processing includes bit-level interleaver and/or bit-level scrambling. Then, the bits of stream 1 are mapped to a constellation position with highest reliability, the bits of stream 2 are mapped to a constellation position second highest reliability, . . . the bits of stream K are mapped to a constellation position with the least reliability, and finally gray-coded bit-to-symbol mapping is applied. After the joint modulation, the spreading, for example, symbol-level spreading, is applied and then the randomization is performed. As shown in FIG. 4B, the randomization is performed after the spreading is applied. The randomization can be performed in a same manner as explained with FIG. 4A.

Referring back to FIGS. 4A and 4B, after the randomization, a resource mapping is performed. Then, the output of the processing of the randomization is transmitted after performing the resource mapping. An IFFT (Inverse Fast Fourier Transform) module can be added after the resource mapping to provide OFDM signal for transmission.

There are various application scenarios for 5G such as mMTS (massive Machine Type Communications), URLLC (Ultra Reliable Low Latency Communications), and eMBB (enhanced Mobile Broadband). For mMTC, CP-OFDM and DFT-s-OFDM need to be supported. DFT-s-OFDM needs to be supported by spreading based schemes since it has low PAPR. In LTE-A, DFT-s-OFDM is applied for uplink signal transmission. After modulation, DFT is performed. In LTE-A, spreading is not applied. In 5G NOMA, the spreading is applied by many schemes. In the case of employing the spreading, it is important to decide where the spreading is placed. When the spreading is performed before DFT, after DFT operation, the signal losses the "spreading" property. Thus, joint space-spreading MMSE operation cannot be performed, which may degrade system BLER (block error ratio) performance.

Figure 5:
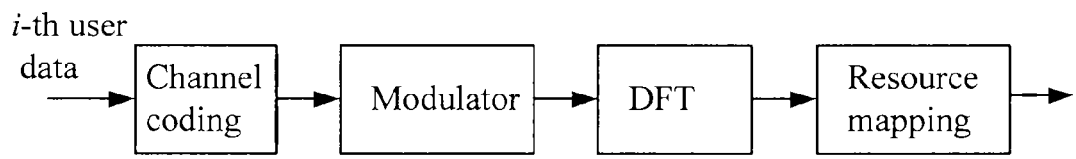
FIG. 5 shows a conventional NOMA data processing for DFT-s-OFDM systems.

FIG. 5 shows a conventional NOMA data processing for DFT-s-OFDM systems. Once data for a user is provided, channel coding is performed on the data to provide a coded signal. The coded signal is then modulated by a modulator. In DFT-s-OFDM, Discrete Fourie Transform (DFT) operation is applied to transform modulated signal to other forms. After the DFT operation, a resource mapping is performed. After the resource mapping operation, an IFFT is performed. The output of the processing is transmitted after performing the IFFT.

Figure 6A:
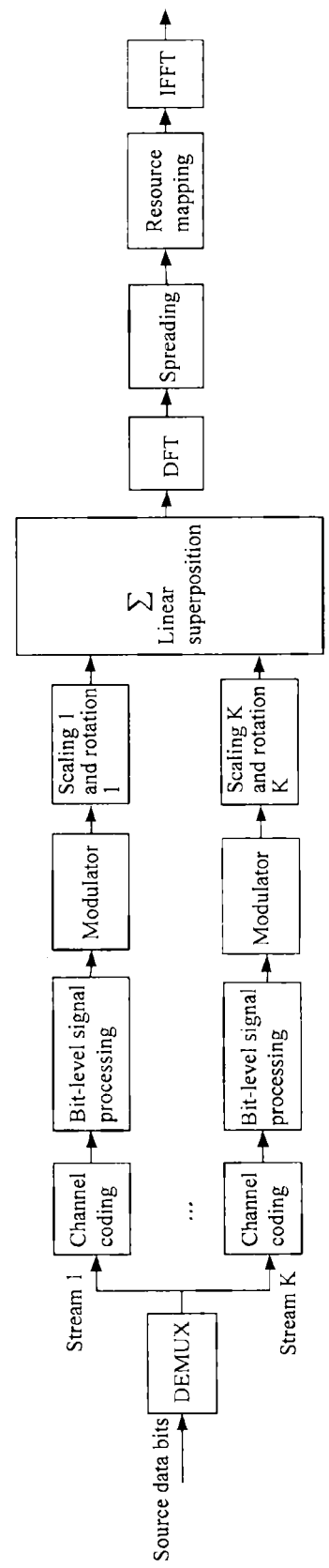
FIGS. 6A and 6B show examples of a multi-branch NOMA scheme for DFT-s-OFDM systems based on some implementations of the disclosed technology.
Figure 6B:
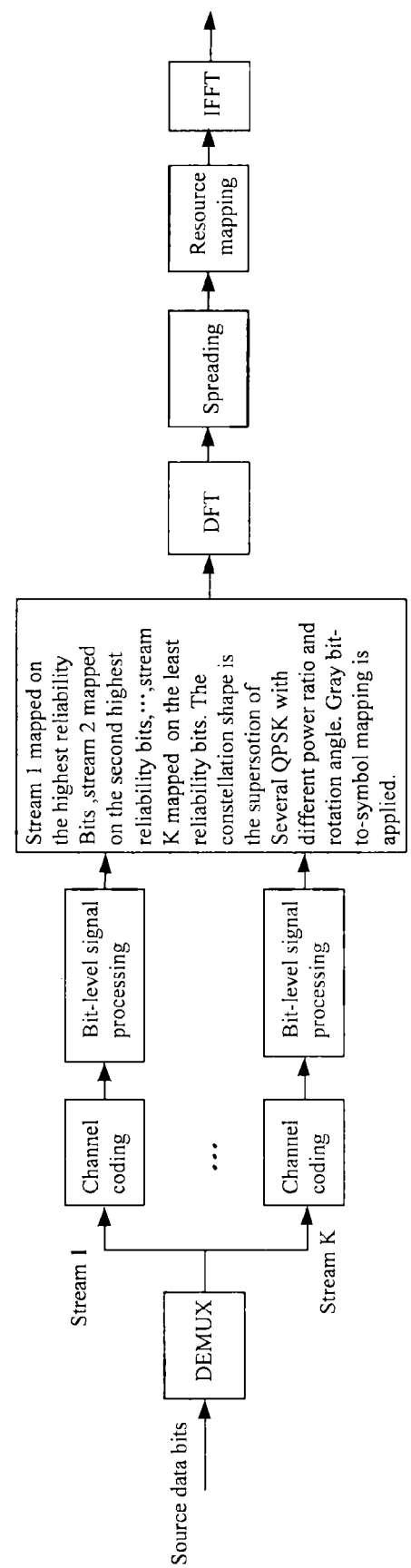

FIGS. 6A and 6B show examples of a multi-branch NOMA scheme for DFT-s-OFDM systems based on some implementations of the disclosed technology. FIG. 6A shows an example of a multi-branch NOMA scheme employing separate modulation and FIG. 4B shows an example of a multi-branch NOMA scheme employing joint modulation where gray bit-to-symbol mapping is employed. Referring to FIG. 6A, information data is divided into K independent data streams. Then, channel coding is performed to each data stream. In some implementations, the same channel code is applied to each data stream. In some implementations, the different channel codes are applied to each data stream. A bit-level signal processing is carried out on the channeled coded bits of each data stream. In some implementations, the bit-level signal processing includes bit-level interleaver and/or bit-level scrambling. The data is then provided to a modulator and further processed to generate modulated data. Scaling and rotation are performed for the modulated data and superposition is performed to provide superimposed signals. The DFT operation is applied on the superimposed signals. After the DFT operation, the signal is spread by using a spreading code. The output of the processing is transmitted after performing a resource mapping. An IFFT (Inverse Fast Fourier Transform) module is added after the resource mapping to provide single-carrier signal for transmission.

In FIG. 6B, after the bit-level signal processing, the bits of stream 1 are mapped to a constellation position with highest reliability, the bits of stream 2 are mapped to a constellation position second highest reliability, . . . the bits of stream K are mapped to a constellation position with the least reliability, and finally gray bit-to-symbol mapping is applied. Then, the DFT operation, spreading, resource mapping and IFFT modules are applied in a similar manner as discussed with regard to FIG. 6A. In the disclosed technology, the spreading is applied after the DFT operation. By applying the spreading after the DFT operation, the user separation is achieved, and the multi-user interference can be suppressed due to joint space-spreading MMSE can be performed. In the disclosed technology, the spreading can be performed on time domain or frequency domain, or both time and frequency domains. In some implementations, sparse spreading code can be used for the spreading operation, which means zeros can be included in the spreading code. In some DFT-s-OFDM systems, DFT-s-OFDM symbol is generated and then it is spread in time domain. When sparse code, for example, [1 0 1 0] is employed, the second and the forth symbol are zero. Then, the power of the first and the third symbols should be boosted. It is impractical because the maximum transmission power for a terminal is limited. Thus, such scheme cannot support sparse code.

However, if performing the spreading operation in frequency domain, zeros are on some subcarriers. In this case, the power of non-zero signal on the frequency domain can be boosted since the whole power of one symbol is not boosted. In some implementations, the spreading code has a non-sparse structure, which means elements of the spreading code are non-zero.

Figure 7:
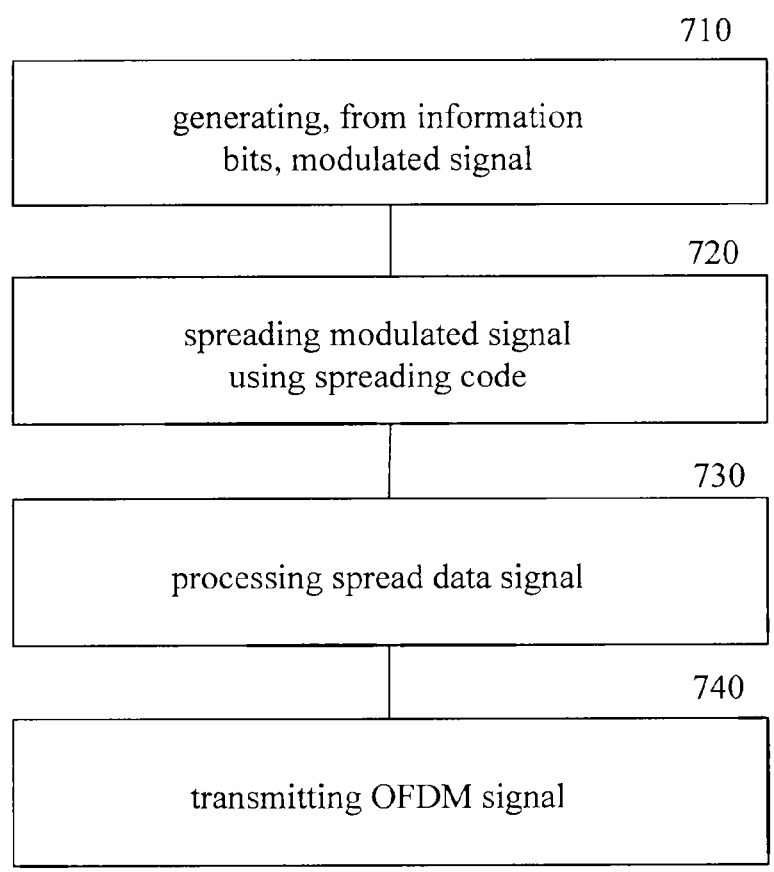
FIG. 7 shows an example of a wireless communication method based on some implementations of the disclosed technology.

FIG. 7 shows an example of a wireless communication method based on some implementations of the disclosed technology. The method may be implemented by a hardware platform 210 such as described with reference to FIG. 2.

The method includes, at step 710, a modulated signal is generated from information bits. The method includes, at step 720, a spreading operation is performed on the modulating signal using a spreading code to provide a spread data signal. The method includes, at step 730, the spread data signal is processed through a randomization. The method includes, at step 740, an OFDM signal is transmitted based on the output of the processing.

In some implementations, the randomization processes the spread data using a scramble code that is cell-specific. In some implementations, the randomization processes the spread data using a scramble code that is user-grouped. In some implementations, the randomization processes the spread data using an interleaver that is cell-specific. In some implementations, the randomization processes the spread data using an interleaver that is user-grouped. In some implementations, the modulated signal is generated in a multiple-branch transmitter system. In some implementations, the method further comprises performing resource mapping after the processing the spread data signal and before the transmitting the OFDM signal. In some implementations, the generating the modulated signal includes dividing the information bits into multiple streams. In some implementations, the method further includes modulating the multiple streams onto a constellation. In some implementations, the constellation is a hierarchical QAM (quadrature amplitude modulation) constellation. In some implementations, the hierarchical QAM symbols is a superposition of several QPSK constellation with different power ratio and rotation angle. In some implementations, the modulating of the multiple streams comprises mapping bits of each of the streams to constellation positions having a corresponding reliability. In some implementations, the bits from the first stream correspond to one or more most significant bits of the hierarchical QAM symbols, wherein bits from the K-th stream correspond to one or more least significant bits of the hierarchical QAM symbols, and wherein bits from a second to (K−1)-th stream correspond to one or more remaining bits of the hierarchical QAM symbols. In some implementations, the method further includes each of the multiple streams is mapped on a constellation with different power ratio and rotation angle. In some implementations, the constellations are linearly superposed together. In some implementations, a number of streams, a spreading factor, the distinct power ratios, and the rotation are selected based on a number of information bits. In some implementations, the modulating the multiple streams includes applying gray-coded bit-to-symbol mapping. In some implementations, the generating the modulated signal includes performing a channel coding to each of the multiple streams. In some implementations, the transmitting the OFDM signal includes applying an inverse fast Fourier transform (IFFT) algorithm to the output of the processing.

Figure 8:
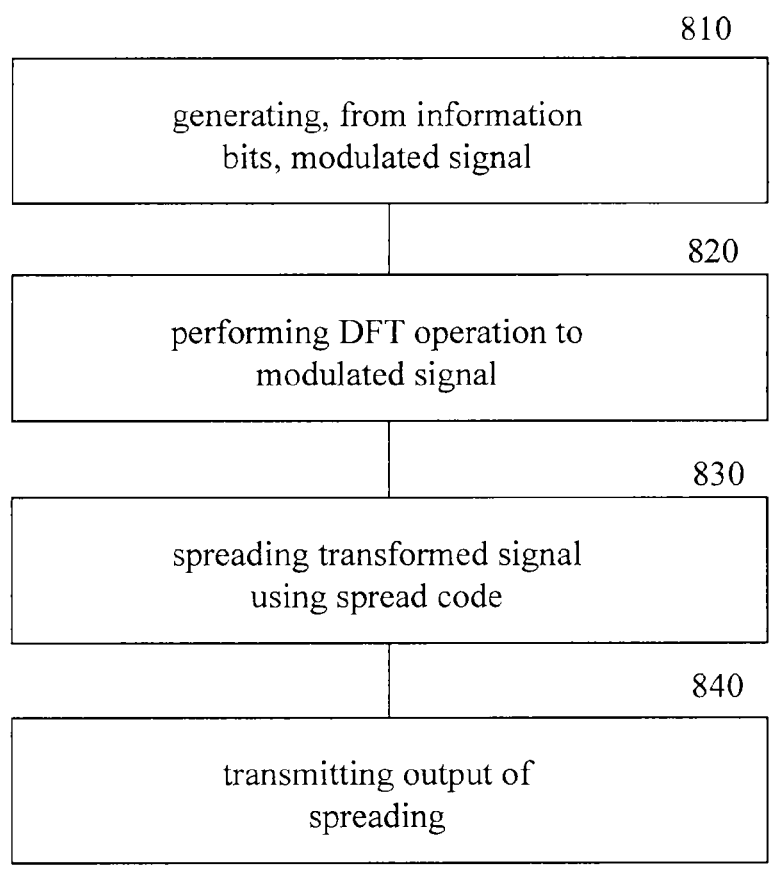
FIG. 8 shows an example of another wireless communication method based on some implementations of the disclosed technology.

FIG. 8 shows an example of another wireless communication method based on some implementations of the disclosed technology. The method may be implemented by a hardware platform 210 such as described with reference to FIG. 2.

The method includes, at step 810, a modulated signal is generated from information bits. The method includes, at step 820, a DFT operation to the modulated signal is performed to provide a transformed signal. The method includes, at step 830, the transformed signal is spread using a spread code. The method includes, at step 840, the output of the spreading is transmitted.

In some implementations, the spread code is a sparse spreading code including zeros. In some implementations, the modulated signal is generated in a multiple-branch transmitter system. In some implementations, the spread code is a non-sparse spreading code having no zeros. In some implementations, the method further comprises performing resource mapping after the spreading the transformed signal. In some implementations, the generating the modulated signal includes dividing the information bits into multiple streams. In some implementations, the method further comprises: modulating the multiple streams onto a constellation. In some implementations, the constellation is a hierarchical QAM constellation. In some implementations, the hierarchical QAM symbols is a superposition of several QPSK constellation with different power ratios and rotation angles. In some implementations, the modulating of the multiple streams comprises mapping bits of each of the streams to constellation positions having a corresponding reliability. In some implementations, the bits from the first stream correspond to one or more most significant bits of the hierarchical QAM symbols, wherein bits from the K-th stream correspond to one or more least significant bits of the hierarchical QAM symbols, and wherein bits from a second to (K−1)-th stream correspond to one or more remaining bits of the hierarchical QAM symbols. In some implementations, each of the multiple streams is mapped on a constellation with different power ratio and rotation angle. In some implementations, the constellations are linearly superposed together. In some implementations, a number of streams, a spreading factor, the distinct power ratios, and the rotation are selected based on a number of information bits. In some implementations, the modulating the multiple streams includes applying gray-coded bit-to-symbol mapping. In some implementations, the generating the modulated signal includes performing a channel coding to each of the multiple streams. In some implementations, the transmitting the output of the spreading includes applying an inverse fast Fourier transform (IFFT) algorithm to the output of the spreading.

Figure 9:
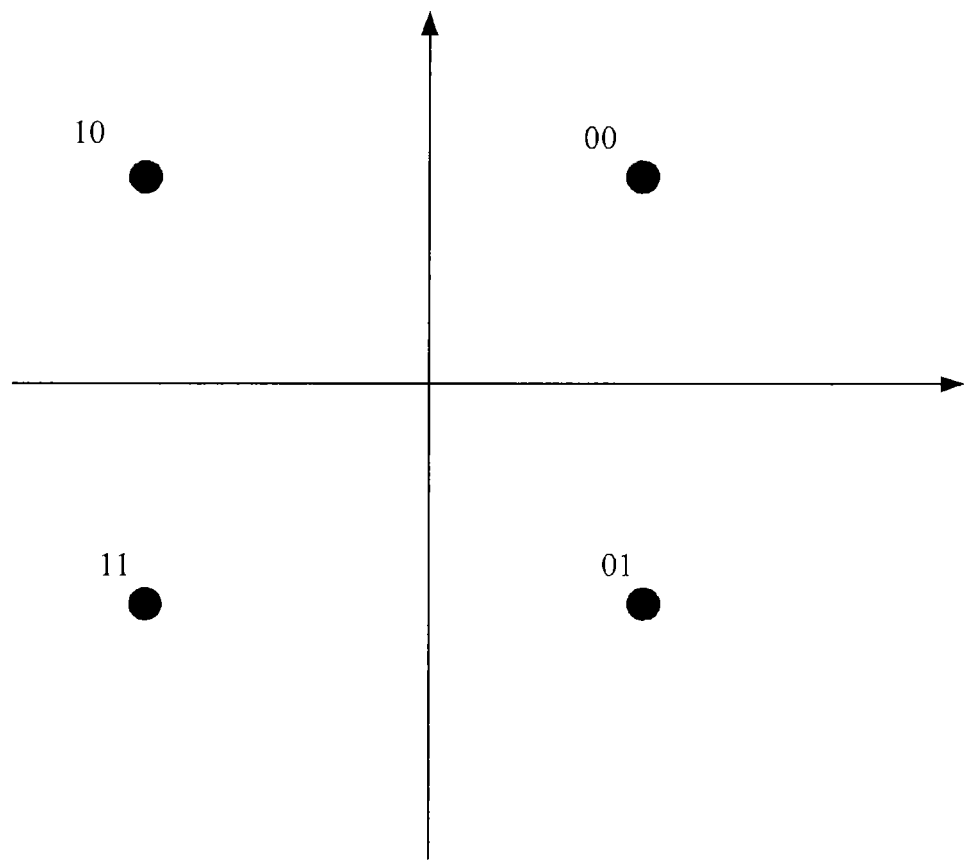
FIGS. 9-11 show examples of gray bit-to-symbol mapping and non-gray bit-to-symbol mapping based on some implementations of the disclosed technology.
Figure 10:
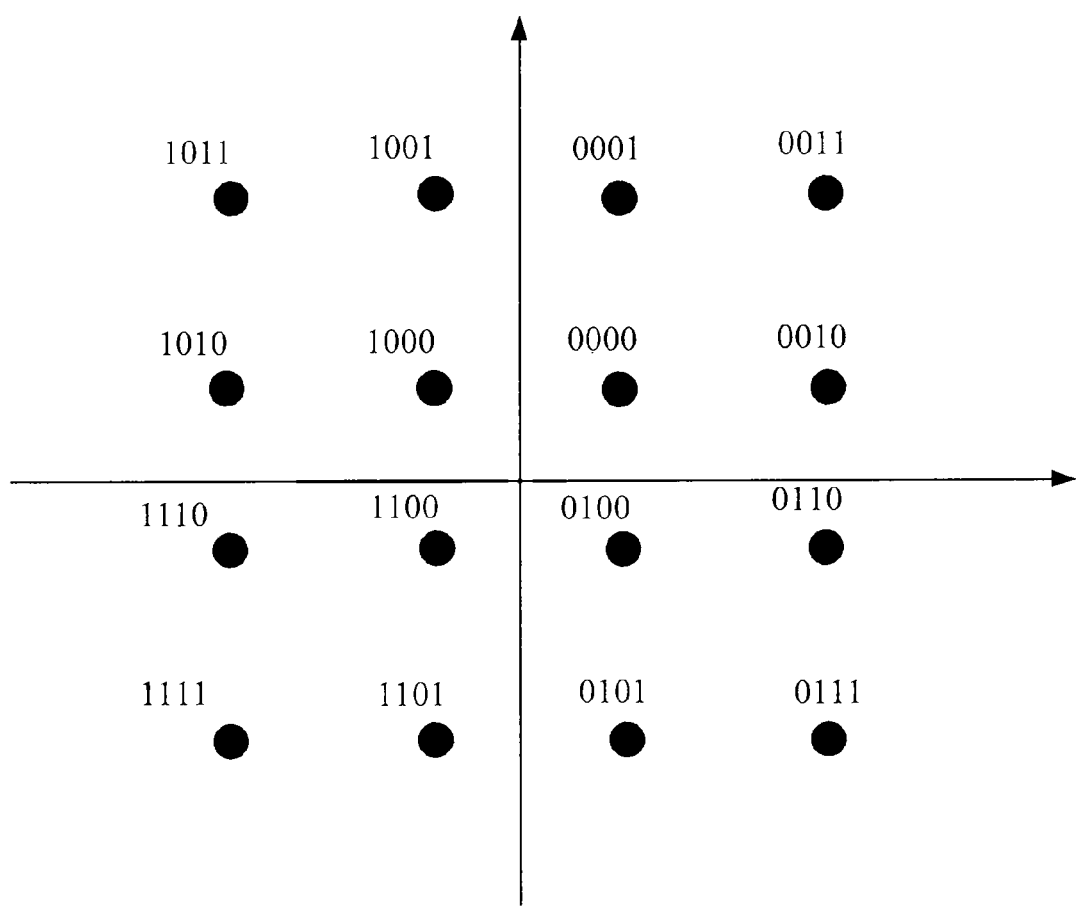
Figure 11:
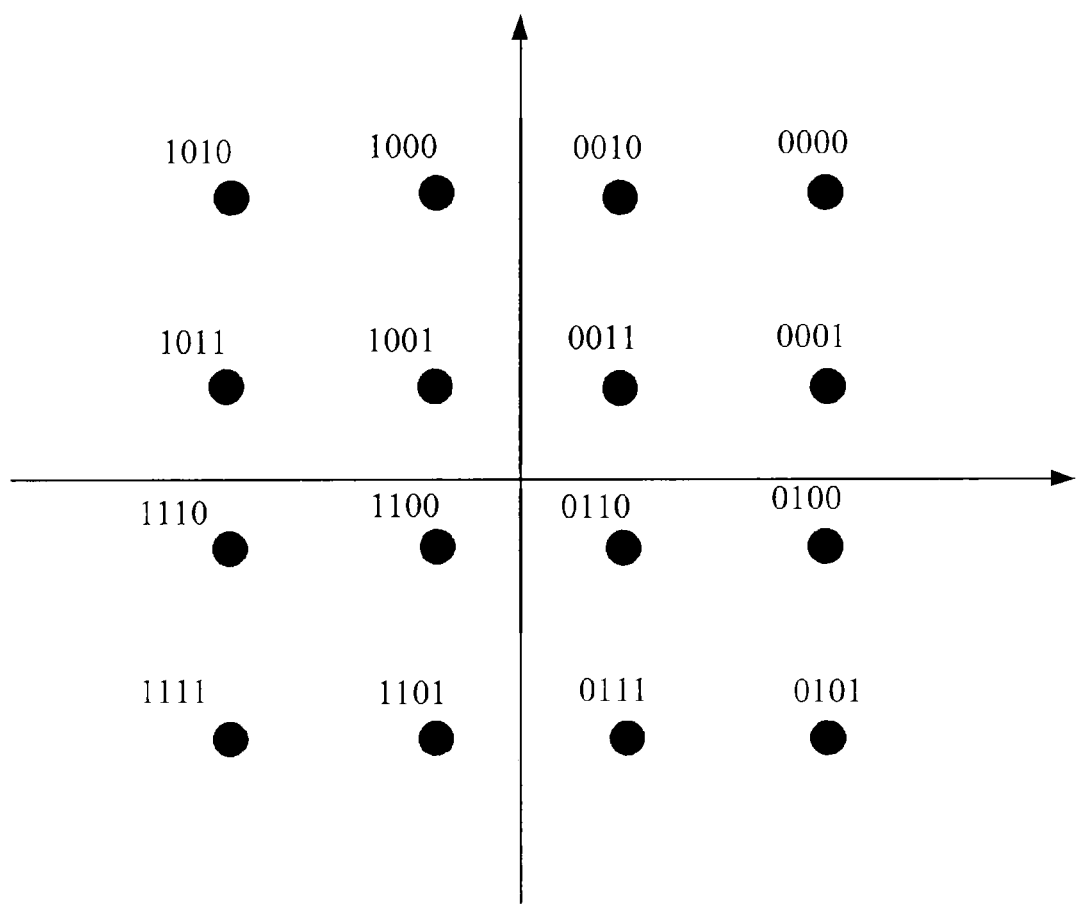

FIGS. 9-11 show examples of gray bit-to-symbol mapping and non-gray bit-to-symbol mapping based on some implementations of the disclosed technology. FIG. 9 is a QPSK constellation with gray bit-to-symbol mapping. FIG. 10 shows the constellation which employs gray bit-to-symbol mapping. FIG. 11 shows the constellation which is the linear superposition of two QPSK signals with power ratio square root (0.8) and (0.2), respectively. It is observed that a non-gray bit-to-symbol mapping is obtained by using independent modulation and constellation linear superposition.

Additional features and embodiments the above-described methods described in FIG. 7 and FIG. 8 are described below using a clause-based description format.

1. A wireless communication method, comprising: generating, from information bits, a modulated signal; spreading the modulated signal using a spreading code to provide a spread data signal; processing the spread data signal through a randomization; and transmitting an orthogonal frequency division multiplexing (OFDM) signal based on an output of the processing.

2. The wireless communication method of clause 1, wherein the randomization processes the spread data using a scramble code that is cell-specific.

3. The wireless communication method of clause 1, wherein the randomization processes the spread data using a scramble code that is user-grouped.

4. The wireless communication method of clause 1, wherein the randomization processes the spread data using an interleaver that is cell-specific.

5. The wireless communication method of clause 1, wherein the randomization processes the spread data using an interleaver that is user-grouped.

6. The wireless communication method of clause 1, wherein the modulated signal is generated in a multiple-branch transmitter system.

7. The wireless communication method of clause 1, further comprising performing resource mapping after the processing the spread data signal and before the transmitting the OFDM signal.

8. The wireless communication method of clause 1, wherein the generating the modulated signal includes dividing the information bits into multiple streams.

9. The wireless communication method of clause 8, further comprising: modulating the multiple streams onto a constellation.

10. The wireless communication method of clause 9, wherein the modulating the multiple streams comprises mapping bits of each of the multiple streams to constellation positions having a corresponding reliability.

11. The wireless communication method of clause 9, wherein the constellation is a hierarchical QAM constellation.

12. The wireless communication method of clause 11, wherein the hierarchical QAM constellation is a superposition of multiple QPSK constellations with different power ratios and rotation angles.

13. The wireless communication method of clause 8, wherein each of the multiple streams is mapped to a constellation with different power ratio and rotated with different angle.

14. The wireless communication method of clause 13, wherein constellations are linearly superposed together.

15. The wireless communication method of any one of clauses 9-13, wherein a number of streams, a spreading factor, the distinct power ratios, and the rotation angles are selected based on a number of information bits.

16. The wireless communication method of clause 9, wherein the modulating the multiple streams includes applying gray-coded bit-to-symbol mapping.

17. The wireless communication method of clause 8, wherein the generating the modulated signal includes performing a channel coding to each of the multiple streams.

18. The wireless communication method of clause 1, wherein the transmitting the OFDM signal includes applying an inverse fast Fourier transform (IFFT) algorithm to the output of the processing.

19. A wireless communication method, comprising: generating, from information bits, a modulated signal; performing a Discrete Fourie Transform (DFT) operation to the modulated signal to provide a transformed signal; spreading the transformed signal using a spread code; and transmitting an output of the spreading.

20. The wireless communication method of clause 19, wherein the spread code is a sparse spreading code including zeros.

21. The wireless communication method of clause 19, wherein the modulated signal is generated in a multiple-branch transmitter system.

22. The wireless communication method of clause 19, wherein the spread code is a non-sparse spreading code having no zeros.

23. The wireless communication method of clause 19, further comprising performing resource mapping after the spreading the transformed signal.

24. The wireless communication method of clause 19, wherein the generating the modulated signal includes dividing the information bits into multiple streams.

25. The wireless communication method of clause 19, further comprising: modulating the multiple streams onto a constellation.

26. The wireless communication method of clause 25, wherein the modulating the multiple streams comprises mapping bits of each of the multiple streams to constellation positions having a corresponding reliability.

27. The wireless communication method of clause 25, wherein the constellation is a hierarchical QAM constellation.

28. The wireless communication method of clause 27, wherein the hierarchical QAM constellation is a superposition of multiple QPSK constellations with different power ratios and rotation angles.

29. The wireless communication method of clause 24, wherein each of the multiple streams is mapped to a constellation with different power ratio and rotated with different angle.

30. The wireless communication method of clause 29, wherein constellations are linearly superposed together.

31. The wireless communication method of any one of clauses 26-29, wherein a number of streams, a spreading factor, the distinct power ratios, and the rotation angles are selected based on a number of information bits.

32. The wireless communication method of clause 25, wherein the modulating the multiple streams includes applying gray-coded bit-to-symbol mapping.

33. The wireless communication method of clause 24, wherein the generating the modulated signal includes performing a channel coding to each of the multiple streams.

34. The wireless communication method of clause 19, wherein the transmitting the output of the spreading includes applying an inverse fast Fourier transform (IFFT) algorithm to the output of the spreading.

35. A wireless communications apparatus comprising a processor and a memory, wherein the processor is configured to read code from the memory and implement a method recited in any of clauses 1 to 34.

36. A computer program product comprising a computer-readable program medium code stored thereupon, the code, when executed by a processor, causing the processor to implement a method recited in any of clauses 1 to 34.

Figure 12A:
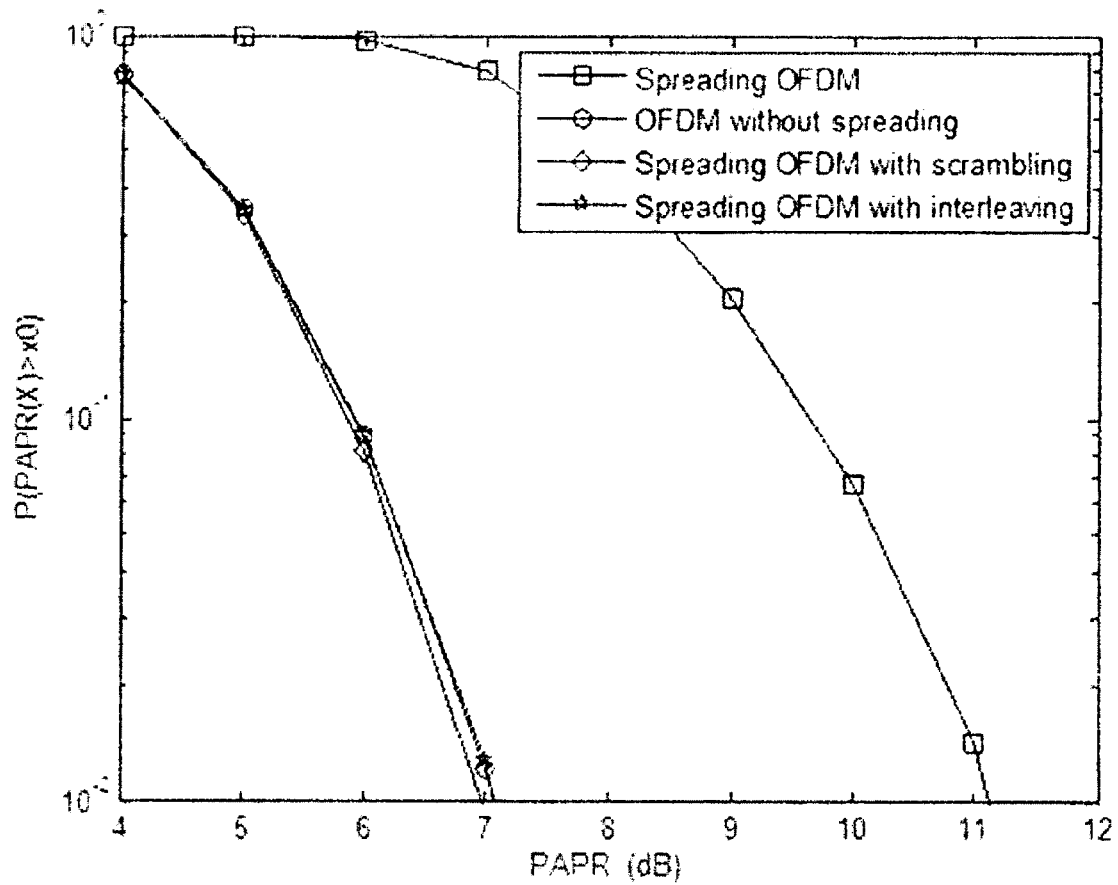
FIGS. 12A and 12B show graphs representing performances of PAPR (Peak-to-Average Power Ratio) based on some implementations of the disclosed technology.
Figure 12B:
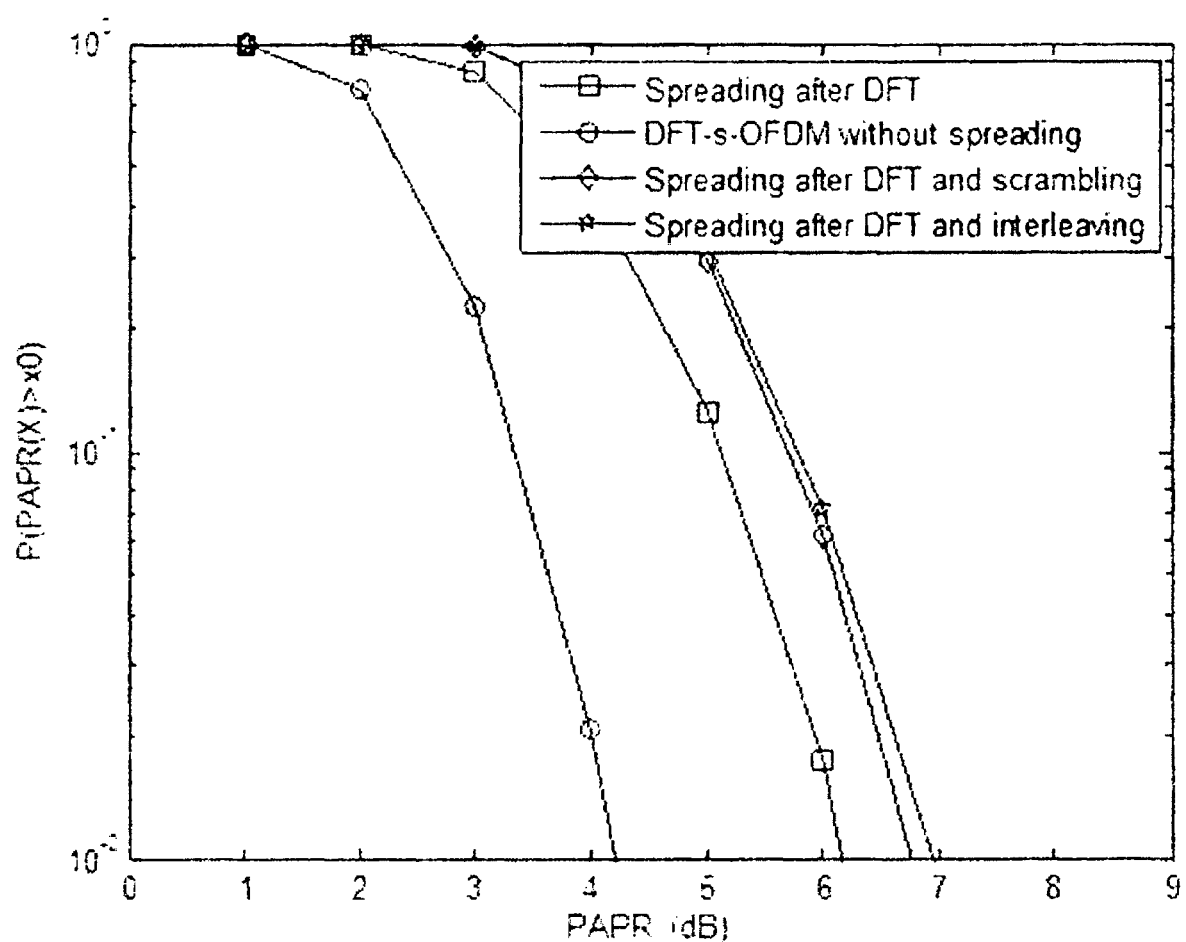

FIG. 12A to 12B show graphs representing performances of PAPR based on some implementations of the disclosed technology. FIG. 12A shows simulation results obtained from CP-OFDM systems and FIG. 12B shows simulation results obtained from DFT-s-OFDM systems. In FIG. 12A, the cell-specific randomization is carried out. From FIG. 12A, it is observed that the spreading OFDM scheme with scrambling and interleaving allows to have a lower PAPR than spreading OFDM scheme. From FIG. 12B, it is observed that the spreading scheme after DFT (without scrambling and interleaving) allows to have a lower PAPR than i) the spreading scheme after DFT with scrambling and ii) the spreading scheme after DFT with interleaving.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
generating, from information bits, a modulated signal;
spreading the modulated signal using a spreading code to provide a spread data signal;
processing the spread data signal through a randomization; and
transmitting an orthogonal frequency division multiplexing (OFDM) signal based on an output of the processing, and wherein the randomization processes the spread data using a scramble code or an interleaver, the scramble code or the interleaver being cell-specific or user-grouped, and
wherein the generating the modulated signal includes dividing the information bits into multiple streams and wherein a number of the multiple streams is selected based on a number of information bits.

2. The wireless communication method of claim 1, wherein the modulated signal is generated in a multiple-branch transmitter system.

3. The wireless communication method of claim 1, further comprising performing resource mapping after the processing the spread data signal and before the transmitting the OFDM signal.

4. The wireless communication method of claim 1, further comprising: modulating the multiple streams onto a constellation.

5. The wireless communication method of claim 1, wherein the multiple streams are mapped to constellations with different power ratios and rotated with different angles.

6. The wireless communication method of any one of claim 5, wherein the different power ratios and the rotation angles are selected based on a number of information bits.

7. The wireless communication method of claim 1, wherein the generating the modulated signal includes performing a channel coding to each of the multiple streams.

8. The wireless communication method of claim 1, wherein the transmitting the OFDM signal includes applying an inverse fast Fourier transform (IFFT) algorithm to the output of the processing.

9. A wireless communication method, comprising:
generating, from information bits, a modulated signal;
performing a Discrete Fourie Transform (DFT) operation to the modulated signal to provide a transformed signal;
spreading the transformed signal using a spread code; and
transmitting an output of the spreading, and
wherein the spread code is a sparse spreading code including zeros or a non-sparse spreading code having no zeros, and
wherein the generating the modulated signal includes dividing the information bits into multiple streams and wherein a number of the multiple streams is selected based on a number of information bits.

10. The wireless communication method of claim 9, wherein the modulated signal is generated in a multiple-branch transmitter system.

11. The wireless communication method of claim 9, further comprising performing resource mapping after the spreading the transformed signal.

12. The wireless communication method of claim 9, further comprising: modulating the multiple streams onto a constellation.

13. The wireless communication method of claim 12, wherein the modulating the multiple streams includes applying gray-coded bit-to-symbol mapping.

14. The wireless communication method of claim 9, wherein the multiple streams are mapped to constellations with different power ratios and rotated with different angles.

15. The wireless communication method of claim 14, wherein a number of the different power ratios, and the rotation angles are selected based on a number of information bits.

16. The wireless communication method of claim 9, wherein the generating the modulated signal includes performing a channel coding to each of the multiple streams.

17. The wireless communication method of claim 9, wherein the transmitting the output of the spreading includes applying an inverse fast Fourier transform (IFFT) algorithm to the output of the spreading.

18. A wireless communications apparatus comprising a processor and a memory, wherein the processor is configured to read code from the memory and implement a method comprising:
generating, from information bits, a modulated signal;
spreading the modulated signal using a spreading code to provide a spread data signal;
processing the spread data signal through a randomization; and
transmitting an orthogonal frequency division multiplexing (OFDM) signal based on an output of the processing, and
wherein the randomization processes the spread data using a scramble code or an interleaver, the scramble code or the interleaver being cell-specific or user-grouped, and
wherein the generating the modulated signal includes dividing the information bits into multiple streams and wherein a number of the multiple streams is selected based on a number of information bits.

* * * * *